Nov. 11, 1958  E. P. WIGNER ET AL  2,860,093
ISOTOPE CONVERSION DEVICE AND METHOD
Filed Nov. 13, 1945
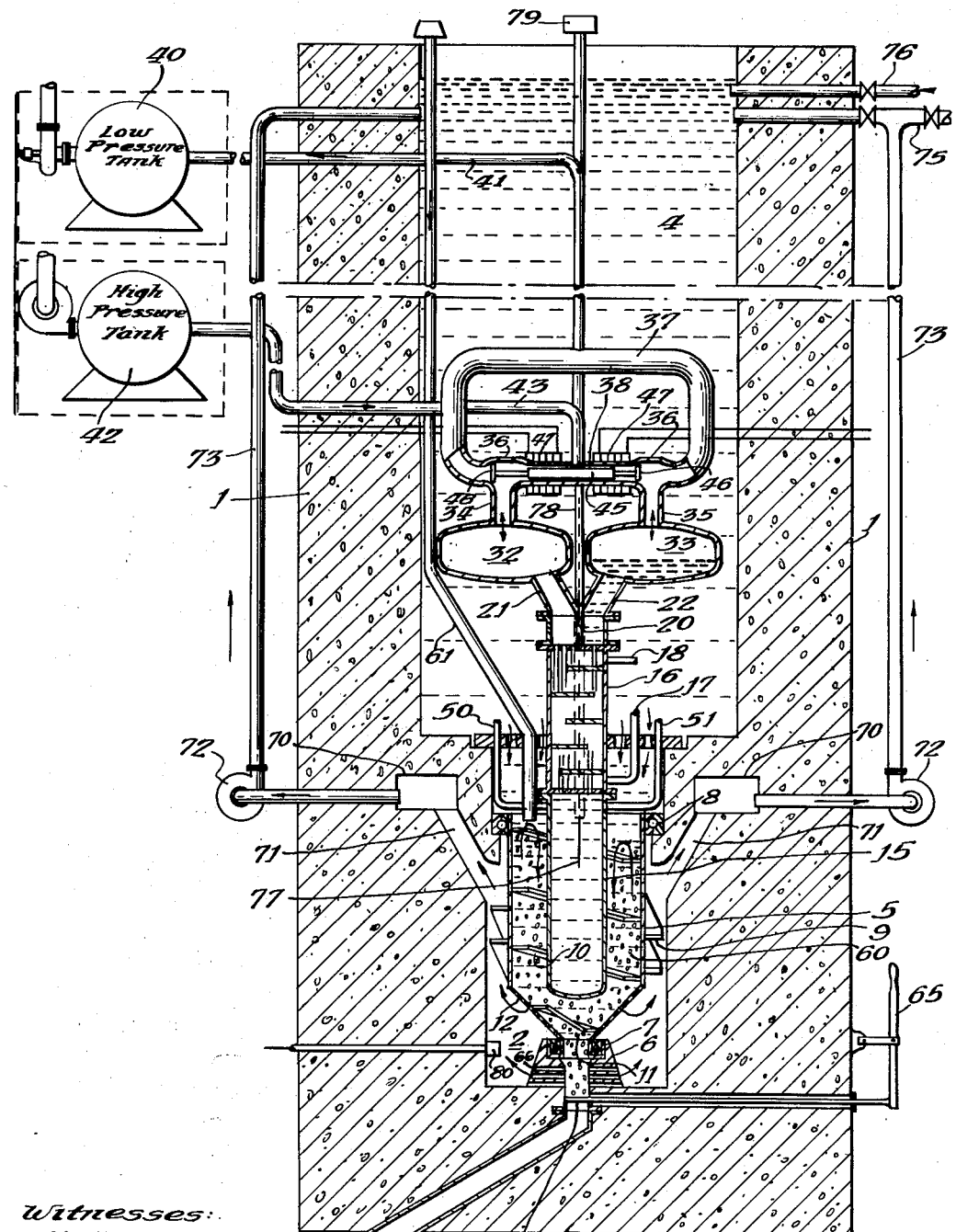
Witnesses:
Herbert E. Metcalf
Walter L. Schlegel, Jr.
Inventor:
Eugene P. Wigner
Leo A. Ohlinger
By Robert A. ———
Attorney.

2,860,093
ISOTOPE CONVERSION DEVICE AND METHOD

Eugene P. Wigner, Princeton, N. J., and Leo A. Ohlinger, Chicago, Ill., assignors to the United States of America as represented by the United States Atomic Energy Commission Application November 13, 1945, Serial No. 628,323

17 Claims. (Cl. 204—154.2)

The present invention relates to nuclear physics and more particularly to an improved means and method of cooling a reactive composition used to sustain a chain fission reaction.

It is known that a self-sustaining chain reaction can be obtained in devices known as neutronic reactors utilizing natural uranium, as a result of slow neutron fission of the $U^{235}$ content of the natural uranium. In such reactors, discrete bodies of natural uranium of high purity are disposed, usually in the form of a lattice arrangement of spheres or rods, in a neutron moderator such as graphite, baryllium or heavy water of high purity, surrounded by a neutron reflector. Neutron absorption in the $U^{238}$ content of the natural uranium during the reaction leads to the production of the transuranic isotope $94^{239}$, known as plutonium (symbol Pu), which is fissionable in much the same manner as $U^{235}$. $94^{239}$ or $Pu^{239}$ is formed in neutronic reactors utilizing natural uranium in accordance with the following process:

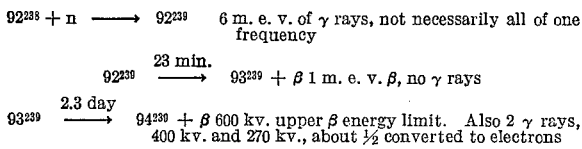

A small portion of the $94^{239}$ produced may also be changed to $94^{240}$ by absorption of neutrons. The neutronic reactors referred to above may be called "isotope converters" in that one fissionable isotope is formed ($94^{239}$) as another fissionable isotope ($U^{235}$) is used up. However, this conversion is not complete, and the natural uranium, which in this case acts to supply both the reaction isotope ($U^{235}$) and the absorption isotope ($U^{238}$), will contain at least two different fissionable isotopes ($U^{235}$ and $Pu^{239}$) after the reaction has been started. Certain presently known uranium-graphite reactors have been found to have a conversion factor of .78, $U^{235}$ to $94^{239}$.

To obtain a more complete conversion of one fissionable isotope to another, it has been proposed to utilize a substantially pure fissionable isotope in solution or dispersion in a liquid moderator for the neutronic reaction, and then form the new fissionable isotope separately by absorption of leakage neutrons produced as a by-product of the reaction.

As liquid type reactors are small when incorporating a fissionable isotope in high concentration, exterior neutron leakage is high and in consequence such reactors are ideal neutron sources for use in isotope converters. Such converters are more fully described and claimed in the copending application of Wigner et al., filed November 13, 1945, Serial No. 628,322, now Patent No. 2,815,321.

The plutonium produced by neutronic reactors using natural uranium to support the reaction, is useful for many purposes, but it has one outstanding advantage over, for example, the use of $U^{235}$, as it exists in natural uranium. As plutonium is a different element from uranium, it can be chemically removed from the irradiated natural uranium, and because of that fact can be obtained in substantially pure form and in high concentrations whereas $U^{235}$ can only be obtained in high concentration or substantially pure form (as far as presently known) by the much more difficult process of isotope separation. $U^{235}$ of high concentration however, has been used to sustain a neutronic reaction.

In high concentrations or substantially pure form, plutonium can also be used, when properly combined with a neutron moderator, to sustain a slow neutron chain reaction in a neutronic reactor of exceptionally small size as compared to the size of reactors using natural uranium. The neutron leakage is high in small reactors. In other words, such reactors can be used as efficient sources of large quantities of neutrons, and the neutrons thus produced can be used to produce another fissionable isotope.

$U^{233}$, another fissionable isotope, can be formed by irradiating thorium ($90^{232}$) with slow neutrons according to the following process:

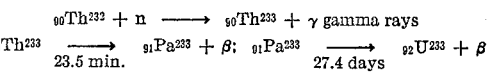

$$_{90}Th^{233} \xrightarrow[23.5 \text{ min.}]{} {}_{91}Pa^{233} + \beta; \quad {}_{91}Pa^{233} \xrightarrow[27.4 \text{ days}]{} {}_{92}U^{233} + \beta$$

The chemical separation of $U^{233}$ from thorium is readily accomplished with high purity. The fissionable isotope $U^{233}$ will support a chain reaction, and has many desirable qualities. In particular, $U^{233}$ gives a relatively high average neutron yield per fission, the value as presently known being about 2.37–2.4 neutrons per fission (average).

While operating to produce a self-sustaining chain reaction, a reactive composition generates heat, and this heat must be removed from the reaction zone. One way by which the composition can be cooled is to circulate the composition through the reaction zone by rotating pumps, then through heat exchangers for cooling, and then return the cooled composition to the reactor in a continuous cycle. As the composition becomes extremely radioactive due to the formation of fission products therein, all exposed pump parts become contaminated and are, in consequence, difficult to replace without a shutdown for sufficient time for the radioactivity to decay to safe levels. Exceptional care is required to prevent pump leaks. Furthermore, in any liquid composition type reactor, exterior holdup of the composition is important as high holdup increases the amount of fissionable isotope in the system at one time, only that amount in the reaction zone itself being usefully employed.

It is therefore an object of the present invention to provide a novel means and method of circulating and cooling the reactive composition of a liquid type neutronic reactor without the use of rotating pumps.

In broad terms, the present invention utilizes a liquid of high fissionable isotope concentration in a reaction zone of sufficient size and isotope density to support a chain reaction. While operating, the liquid is oscillated back and forth through the reaction zone by gas pressure, and cooled while outside of the reactor.

Another object of the invention is to provide a novel method and means for withdrawing the gaseous products of nuclear reaction formed within the reactive composition. This object is accomplished by alternately subjecting portions of the fluid composition to high and low gas pressures thus causing the pulsating or oscillating action above described, and the gaseous reaction products are withdrawn from the composition during the low pressure stages of the oscillation cycle.

Still another object of the invention is to design an isotope converter such as above described wherein means are provided for stirring the neutron absorbent material which is disposed adjacent the chain reaction and is adapted to be bombarded by neutrons generated thereby, said means comprising novel means for rotating the tank or container in which said material is disposed.

The present invention will be described for use in an isotope converter where $94^{239}$ obtained from neutron irradiated natural uranium is used in solution in water, light or heavy, to support a chain reaction and to supply neutrons for absorption in $90^{232}$ to form the fissionable isotope $U^{233}$.

The drawing shows diagrammatically a vertical sectional view, partly in elevation, of one embodiment of the present invention.

Referring to the figure, concrete walls 1 are provided defining a pit having a lower cylindrical portion 2, and an upper portion 4 which also can be cylindrical and larger in diameter than the lower portion. In the lower portion is positioned a rotatable cylindrical absorber tank 5 mounted on a lower block 6 by means of lower bearings 7 and maintained upright by upper bearings 8. Absorber tank 5 is smaller than the lower pit portion 2 and is provided on its outer surface with spirally applied fins 9 and on its inner surface with stirring paddles 10. The bottom of the absorber tank is coned and provided with an axial outlet 11 and cone perforations 12.

Axially located inside absorber tank 5 and clearing paddles 10 is an elongated cylindrical reaction tank 15 attached at its upper end to a tube type heat exchanger 16 having vertical tubes and supplied with coolant through inlet 17 and outlet 18.

At its upper end, the tubes of the heat exchanger 16 connect with a divided fitting 20 dividing the flow path into two diverging tubes 21 and 22, respectively, connecting with flattened surge tanks or chambers 32 and 33 positioned side by side in upper pit portion 4. Chambers 32 and 33 are provided with upper gas outlet tubes 34 and 35, respectively.

Each gas outlet tube extends through a two position valve cage 36. Each cage 36 is connected on one side to a low pressure manifold 37 and on the other side to a high pressure manifold 38. Low pressure manifold 37 is connected to a low pressure tank 40 by low pressure pipe 41 and high pressure manifold 38 is connected to a high pressure tank 42 by a high pressure pipe 43, both tanks being positioned outside of the pit. The low pressure tank 40, however, must be shielded, as will later be pointed out.

High pressure manifold 38 connecting the valve cages 36 is straight and contains a horizontal armature 45 having a valve 46 on each end thereof constructed to fit two valve seats in each valve cage 36. The armature is moved by electric current in field coils 47 wound outside of the high pressure manifold 38, which is of nonmagnetic material such as brass, for example.

By proper application of current to the field coils 47, the armature 45 and its attached valves can be reciprocated to connect first one, and then the other surge chamber, to the high pressure tank 42 while the other chamber is under a lower pressure. As shown in the drawing, the valve is positioned to place the left hand chamber under high pressure, while the right hand chamber is under lower pressure. The gas used for the pressure application is preferably helium.

A reactive solution, such as a solution of $94^{239}$ in water, light or heavy, is placed in the reaction tank 15 and sufficient additional solution is added to completely fill one half of the heat exchanger and to about half fill one surge chamber when the other surge chamber is empty, and the connected other half of the heat exchanger is practically empty.

By cyclically operating the solenoid valves 46 as described, a pulsating differential pressure is placed on the solution, and the solution is forced out of one surge chamber, through the heat exchanger 16 and into the other surge chamber and back again. The movement of the solution may be termed oscillative or reciprocative, depending on the particular arrangement of surge tanks, heat exchangers, and reactor tank. The volumes are so coordinated that at each pulsation the entire amount of solution in the reactor is cooled.

Solution is withdrawn and supplied to the system by solution outlet pipe 50 and solution inlet pipe 51, respectively, positioned at the top of the reaction tank 15.

The reaction tank 15, when filled with solution, defines a reaction zone. The space between the reaction tank 15 and the absorber tank 5 defines an absorption zone. In this latter space is placed a quantity of thorium oxide pellets 60 introduced through absorber supply pipe 61. Pellets 60 can be removed from the absorption zone through axial outlet 11 connected with an absorber outlet pipe 62 through bearing block 6. The pellets 60 are held in the absorbing zone by absorber valve 64 operated by lever 65 outside of walls 1.

The thorium in the absorbing zone also needs to be cooled, and the entire device needs to be shielded at the top of the pit. Consequently, the pit is filled with water ($H_2O$) to provide a shield layer 50 to 75 ft. high over the surge chambers 32 and 33. This water shield is circulated both to cool the thorium pellets, and to rotate the absorber tank 5 to stir up the pellets 60. This water circulation will next be described.

The head of water in the pit is applied to the top of the absorber tank 5 which is open. The water passes through the voids between the pellets 60 and enters lower pit portion 2 through apertures 12, and also through bores 66 in bearing block 6 so that the pellets 60 immediately above the valve 64 can be cooled. The water then passes upwardly between the absorber tank 5 and the pit walls, exerting pressure on spiral fins 9 to rotate the absorber tank 5. The water then passes into a circumferential collector 70 through a plurality of passages 71 near the top of the absorber tank 5. Water from the collector 70 is then pumped up to the top of the pit by a plurality of pumps 72 and risers 73. Thus, as the water circulates the absorber tank 5 is rotated so that paddles 10 will stir up pellets 60.

As will be pointed out later, the circulated shield water will become slightly contaminated in time by radioactive products formed in the absorption zone. Consequently, a certain amount of water is continuously removed from the pit through drawoff pipe 75 leading from one of the pumps, and fresh water is admitted through makeup pipe 76. The radioactivity is thus prevented from building up in the shield water.

The reaction is controlled by the customary control rod 77 extending into the reaction tank at sufficient distance laterally from the central axis so that it can slide in a vertical tube 78 extending upwardly through heat exchanger 16, past the pressure and vacuum manifolds at one side thereof, to emerge above the water level at the top of the pit. The rod passes through a stuffing box 79 at the top of the tube so that it can be vertically moved by any convenient means to position more or less thereof in the reaction tank 15. The lower end of the rod 77 is formed of a high neutron absorbing material, such as cadmium, and absorbs sufficient neutrons when fully inserted to prevent a chain reaction from being sustained. When partially removed from the reaction zone, a chain reaction with a reproduction ratio of over unity will occur. The neutron density will rise to a desired power output and the rod 77 is then inserted to a point where the reproduction ratio is unity. Small movements of the rod 77 thereafter serve to maintain the chain reaction at the desired power level. The neutron density is monitored by a conventional ionization chamber 80.

Having discussed the mechanical structure of the device, the nuclear physics thereof will be next taken up.

The reactive solution is, for example, plutonium sulphate dissolved in water. When heavy water is used for a moderator there is less neutron absorption in the moderator than when $H_2O$ is used, but both are suitable. Plutonium sulphate can be used in a thin stainless steel tank, and such a tank absorbs few neutrons. Thus, practically all neutrons leaving the reaction zone will enter the absorption zone on three sides. In a reactor of small size, about 50 percent of the neutrons generated escape outwardly. By the use of an elongated reaction zone, as shown, end leakage is greatly reduced, and the leakage around the middle of the reactor is increased. Thus even though there is no absorber present at the top of the reaction zone, neutron loss at that point can be reduced to about 1 percent.

The excess fast and slow neutrons not used in the chain reaction or parasitically absorbed in the reaction zone escape into the absorption zone. Here the slow neutrons are absorbed in the thorium to form $U^{233}$. The thickness of the absorption zone should be about 50 centimeters to insure slowing to thermal energy most of the fast neutrons escaping the reaction zone.

Due to the fact that the thorium is continually stirred, the pellets 60 are uniformly irradiated. Otherwise the pellets closest to the reaction zone would have the highest $U^{233}$ content and in turn, would have most fissions of the $U^{233}$ formed therein by absorption of escaping neutrons. If the $U^{233}$ content rises much above .01 percent, the loss by fission requires it to be removed. By continually stirring the pellets, the thorium can stay in the absorption zone until all the pellets 60 reach a $U^{233}$ concentration requiring removal. When that time comes, valve 64 is operated to dump all or part of the pellet 60 charge into discharge pipe 62 and into a shielded coffin (not shown) for chemical removal of the $U^{233}$.

However, the fact that some fissions do occur in the thorium leads to a small contamination of the shield water flowing over the thorium pellets 60. If the shield water were not continuously drawn off and made up with fresh water, the contamination of the shield water could accumulate and rise to unsafe biological levels. If a body of water is near, water can be passed through once only with discharge into a retention basin for aging, to eliminate all but the longer half-lived products.

It will be noted that when the solution enters a surge chamber, 32 or 33, it is under reduced pressure. This reduced pressure aids in the release of any gases formed during operation of the reactor. The released gases are then passed to the low pressure tank and then are exhausted. Several types of gas are formed during operation and should be removed.

In neutronic reactors operating at high neutron densities, radioactive elements of exceedingly high capture cross-section are formed relatively quickly in the reactive composition as an intermediate element in the decay chains of the fission fragments. One of the most important of these decay chains is believed to be the 135 fission chain starting with tellurium, as follows:

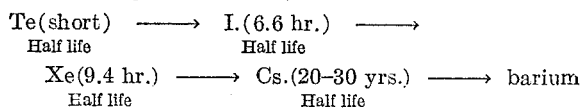

The neutron absorptions of tellurium, iodine, caesium and barium are relatively unimportant, but the neutron capture cross-section of radioactive xenon 135 has been measured to be about $2,500,000 \times 10^{-24}$ cm.$^2$, many times larger than that of stable gadolinium, for example, the cross-section of which is about $30,000 \times 10^{-24}$ cm.$^2$. Upon absorption of a neutron, xenon 135 shifts to xenon 136 an element of relatively small capture cross-section.

The rate of production of the originating fragment of the 135 chain is a function of the neutron density in which the fissionable isotope is immersed, and therefore dependent upon the power at which reactors of given type are operated. The radioactive xenon 135 is produced with a noticeable effect on the reaction a few hours after the reaction is started and the effect is, of course, greater as the neutron density is increased and maintained. The xenon 135 effect on the operation of high power reactors, when the xenon 135 remains in the reactor, as before stated, can be summarized as follows:

The reaction is started by withdrawing the control rod 77. The neutron density rises at a rate determined by the reproduction ratio and the effect of the delayed neutrons, until some predetermined neutron density is attained. The control rod 77 is then placed in the unity reproduction ratio position and the reaction is stabilized at the power desired. During this time, the radioactive iodine is formed, decaying to xenon 135. As more and more iodine decays, more and more xenon 135 is formed, this xenon 135 absorbing neutrons, thereby reducing the reproduction ratio. This absorption also converts the xenon 135 to xenon 136 which has no excessive capture cross-section. The neutron density drops. If no compensation were made for this drop, the neutron density might drop until background conditions prevailed, and then the reaction might automatically start up as xenon 135 decayed. Normally, the neutron density drop is compensated for by removal of the control or equivalent rod 77 to a new position where the reproduction ratio is again above unity. As neutron density rise occurs, bringing the density back to its former level, more xenon 135 is formed and the process is repeated until an equilibrium condition is reached where the xenon 135 formed is transmuted by neutron absorption and by decay into isotopes of lower capture cross-section as fast as it is being formed. In the meantime, the control rod 77 (or equivalent) has to be withdrawn by an amount thereby removing from the reactor, neutron absorbers at least equal in effect to the absorption caused by the equilibrium amount of xenon 135. This requires a larger initial reactor size to make the reaction possible with the xenon in the reactor. In the reactor herein described, however, a large portion of this gaseous neutron absorber can be removed and the reactor kept small in size. For example, in the solution reactor above described, and operating, for example, at 100,000 kw., about 100 grams of 94 will undergo fission each day, and the amount of xenon 135 formed is about 3.3 gm. If this were permitted to remain in the system as long as one day, its total cross-section would be five times greater than that of all the $94^{239}$ present. In order to reduce the total xenon 135 cross-section to one percent of the total cross-section of the fissionable isotope, the xenon 135 formed should be eliminated about every five minutes, or as done here, continuously by release in the chamber.

However, xenon 135 is not the only non-condensible gas produced in the reaction zone during operation. Many other fission products have decay, and daughter decay, chains including gaseous components later decaying to solids. By removal in gaseous form a substantial elimination of these other fission products is obtained that might otherwise eventually poison the reaction.

In addition, nuclear fission of isotopes dissolved in water causes a substantial amount of disintegration or dissociation of the water. The presently described reactor operating, for example, at high power can release many liters of NTP hydrogen (deuterium)-oxygen mixture per second. These gases have a desirable effect in that they carry the xenon and other gaseous fission products with them. Explosions are prevented by dilution of the O–H and O–D gases by the helium gas in the surge chambers as they are swept out of the chambers in which they are released. When $D_2O$ is used, the dissociated gases are recombined by ignition and the $D_2O$ reused. Condensible gases are in most cases condensed on the walls of the chambers as these walls are cooled by the shield water.

Other radioactive fission products (in addition to those having gaseous stages of decay) with high cross sections, such as samarium, are produced, and will cause a small neutron loss even if the solution is purified once a day by continuous removal and resupply through pipes 50 and 51. However, this loss can be tolerated and purification every few days will also remove corrosion products before they can build up to any substantial loss factor, and will permit the replacement of the amount of fissionable isotope destroyed by fission.

With respect to purification of the reactive solution, i. e., decontamination of the solution by removal of the remaining fission and corrosion products, a solvent extraction process has been found satisfactory.

A water solution containing the fissionable isotope which has been reacted and therefore contains solid fission products, is pumped from the converter and made 1 N in $HNO_3$ and 10 N in $NH_4NO_3$. It is then charged to the center of a continuous countercurrent extraction column. A suitable water immiscible solvent, such as hexone or dibutyl Carbitol, is charged to the column at the bottom and passes up through the water phase.

The fissionable isotope passes from the water solution into the organic solvent, which is separated at the top of the column. The water solution containing the fission products is passed out of the bottom of the column into waste. The organic solvent containing the fissionable isotope is next charged to a similar continuous countercurrent extraction column at the bottom and re-extracted into a water solution of the composition used in the pile. The columns are identical in construction, and the water layer from the bottom of the second column can be pumped directly back into the reactor or can be passed through further purification cycles as above, if needed.

When the fissionable isotope is dissolved in deuterium oxide, the extraction column is not directly connected as the deuterium will exchange with the hydrogen of the solvent. In this case, the plutonium salt is separated first from the heavy water, and then purified as above.

When the above described reactor is operated with the plutonium dispersed as plutonium sulphate in solution in a light water ($H_2O$) moderator, a typical reactor of this type is as follows:

Volume of reactor _____ 3 cu. meters
                                    (3000 liters)
Plutonium per liter (as sulphate)___ 1 gm.
Total plutonium in reactor_____ 3 kg.
Holdup_____ 1.5 cu. meters.
Pulsation cycle_____ 2 sec.
Velocity (1 atmosphere differential
  pressure) _____ 8 m./sec.
Power_____ Up to 100,000 kw.

The following typical data is given for pulsating reactors using a $94^{239}$ solution or slurry, in a $D_2O$ moderator.

| Concentration $94^{239}$ | Large scale .0003 gm.s./cc. | Small scale .001/gm.s./cc. |
|---|---|---|
| Amount 94 | ¼ kg. | 1 kg. |
| Amount in reaction zone | 4,200 liters | 1,000 liters. |
| Holdup | 800 liters | 300 liters. |
| Pulsation cycle | 2 sec. | 2 sec. |
| Velocity (1 atmosphere differential pressure) | 8 m./sec. | 8 m./sec. |
| Temperature drop (1 pulsation) | 40° C | 40° C. |
| Power | up to 140,000 kw. | up to 54,000 kw. |
| Length of pipes in Exchanger | 100 cm | 100 cm. |
| Diameter of pipes in Exchanger | 1 cm | 1 cm. |
| Temperature of exit water | 70-80° C | 70°-80° C. |

The pulsating method of cooling a reactor having a liquid reactive composition can also be applied to a reactor using natural uranium. When a uranium oxide slurry is used as the reactive composition, typical data is as follows:

Volume of reactor _____ 30 cu. meters.
Length of exchanger tubes_____ 200 cm.
Diameter of exchanger tubes_____ 2 cm.
Velocity_____ 14 m./sec.
Pulsation time_____ 2 sec.
Slurry holdup_____ 22 tons
Power_____ Up to 200,000 kw.

As uranium slurries tend to erode rotating pump parts, the pulsating method of circulation is particularly useful when slurries are used for the reacting composition.

It can be seen from the above that a principal feature of the present invention is the oscillating circulation of the solution by means of alternating differential gas pressures. This eliminates the need for rotating pumps. It can readily be understood that the reactive solution, even when out of the reaction zone is highly radioactive due to fission fragment content. Rotating pumps used to circulate the solution through heat exchangers must therefore be shielded. They become contaminated and must be left to age before removal from their shielded position if they need replacement. They also cause solution holdup in themselves and in the return piping. In the system above described however, the circulation system can be completely sealed and operated in sealed condition. No stuffing boxes are required at any point.

While the theory of nuclear reactions set forth herein is based on the best presently known experimental evidence, the invention is not limited thereto, as additional experimental data later discovered may modify the theory disclosed.

Obviously, many modifications may be made in the specific embodiments disclosed without departing from the intended scope of the invention.

What is claimed is:

1. The method of cooling the fluid reactive composition of a neutronic reactor which comprises cyclically oscillating the reactive composition through a chain reaction zone while maintaining a sufficient amount of the reactive material in the reaction zone to maintain the chain reaction.

2. The method of cooling a fluid neutronically reactive composition which comprises establishing a chain reaction in said fluid within a reaction zone, cyclically moving said fluid out of said zone by application of gas pressure thereto, and cooling said fluid while outside of said zone while maintaining a sufficient amount of the reactive material in the reaction zone to maintain the chain reaction.

3. The method of cooling a fluid neutronically reactive composition which comprises establishing a chain reaction in said fluid within a reaction zone, cyclically moving said fluid in a reciprocative manner out of and back into said zone by application of gas pressure thereto while maintaining a chain reaction within said zone, and cooling said fluid while moving it out of and back into said zone.

4. A method of cooling a fluid reactive composition in a neutronic reaction system comprising oscillating a portion of said composition between a reaction tank and surge tanks and through a heat exchange device while maintaining a sufficient amount of the composition in the reaction tank to maintain a chain reaction.

5. A method of cooling a body of fluid reactive composition in a neutronic reactor comprising oscillating a portion of said composition between a reaction tank and a heat exchange device connected thereto by substantially simultaneously alternately developing and releasing a charge of compressed gas against said body at a plurality of points while maintaining a chain reaction in the reaction tank.

6. A method of withdrawing the gaseous products of nuclear reaction within a neutronically reactive fluid composition of thermally fissionable material and liquid neutron moderator comprising forcing some of said composition from a reaction chamber alternately into first one and then another of a pair of pressure chambers by alternately applying high and low pressure gas to the respective chambers, and carrying off the gaseous products from the low pressure sides.

7. A method of withdrawing the gaseous products of thermal nuclear reactions within a neutronically reactive fluid composition comprising oscillating said composition between a reaction zone and a plurality of pressure zones by alternately subjecting respective pressure zones to high and low gas pressures while maintaining the reaction in the reaction zone.

8. A method of sustaining a nuclear chain reaction comprising the steps of loading a reaction chamber with a body of reactive fluid composition having a neutron reproduction ratio greater than unity, and then oscillating a portion of said composition between said chamber and heat exchange means externally thereof without decreasing the size of said body to a point at which neutron losses from the periphery thereof are effective to reduce said ratio to a value below unity.

9. In a system of the class described, a chamber, means therein for sustaining a thermal nuclear chain reaction comprising a fluid composition including fissionable material and liquid neutron moderator, heat exchange means, additional amount of said fluid composition in said heat exchange means, and means for oscillating said composition between said chamber and said heat exchange means.

10. A system of the class described comprising a reaction chamber, means therein for sustaining a thermal nuclear chain reaction comprising a fluid composition including thermally fissionable material and liquid neutron moderator, and a fluid-circulating system associated with said chamber for circulating a portion of said composition in an oscillating manner, said system comprising heat exchange means connected to said chamber, a plurality of pressure tanks independently connected to said chamber through said heat exchange means, and means for alternately subjecting respective tanks to high and low gas pressures.

11. In a system of the class described, a reaction chamber, a pair of tanks having independent connections to said chamber, heat exchange means associated with said connections for cooling fluid passing therethrough, means in said system for sustaining a thermal nuclear chain reaction comprising a body of liquid neutron moderator filling said chamber and partially filling one of said tanks, and thermally fissionable material carried by said liquid, and means for oscillating a portion of said liquid and fissionable material through said heat exchange means comprising means for alternately subjecting respective tanks to high and low gas pressures.

12. In a system of the class described, a reaction chamber, a pair of pressure chambers having independent connections thereto, means in said system for sustaining a thermal nuclear chain reaction comprising reactive composition in said reaction chamber including thermally fissionable material and liquid neutron moderator, and means for withdrawing from said composition the gaseous products of nuclear reactions therein, said last-mentioned means comprising means for alternately subjecting respective chambers to high and low gas pressures.

13. In a neutronic reactor, a chamber, a plurality of heat exchangers externally thereof and independently connected thereto, a body of fluid neutronically reactive composition capable of sustaining a thermal nuclear chain reaction, and means for alternately pulsating said composition between said chamber and respective heat exchangers without reducing the mass of said body below the critical size at which the same is capable of sustaining said reaction.

14. In an isotope converter, a rotatable tank, a fixed reaction tank therein, means in said reaction tank for sustaining a thermal nuclear chain reaction, and means carried by said rotatable tank for stirring material therein.

15. In an isotope converter, a rotatable tank, a neutron-permeable container therein, means in said container for sustaining a thermal nuclear chain reaction, means for circulating coolant fluid through said tank, means on said tank for cooperation with said coolant fluid to impart a rotary motion to said tank, and means carried by said tank for stirring material therein.

16. In an isotope converter, inner and outer tanks, said inner tank being formed of neutron-permeable material, means in one of said tanks for sustaining a nuclear chain reaction, means for passing coolant fluid through the other tank in heat exchange relationship with material therein, and means for stirring material in said other tank comprising means responsive to the motion of said fluid for rotating said other tank.

17. In an isotope converter, a tank, a neutronic reactor in co-axial relationship with said tank and separated therefrom in spaced relationship thereto by a neutron-permeable wall, means for moving said tank, and means operable by the motion of said tank for stirring material therein.

References Cited in the file of this patent

UNITED STATES PATENTS

| | | |
|---|---|---|
| 1,248,851 | Heisler | Dec. 4, 1917 |
| 1,432,170 | Fenton | Oct. 17, 1922 |
| 2,042,428 | Krekeler | May 26, 1936 |
| 2,127,193 | Toulmin | Aug. 16, 1938 |
| 2,206,634 | Fermi et al. | July 2, 1940 |

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

Kelly et al.: Phy. Rev. 73, 1135–9 (1948).

UNITED STATES PATENT OFFICE
CERTIFICATE OF CORRECTION

Patent No. 2,860,093            November 11, 1958

Eugene P. Wigner et al.

It is hereby certified that error appears in the printed specification of the above numbered patent requiring correction and that the said Letters Patent should read as corrected below.

Column 7, line 55, in the table, second column thereof, third line, for "¼ kg" read -- 1¼ kg --.

Signed and sealed this 4th day of April 1961.

(SEAL)
Attest:    ERNEST W. SWIDER

Attesting Officer                         ARTHUR W. CROCKER
                                                   Acting Commissioner of Patents

UNITED STATES PATENT OFFICE
CERTIFICATE OF CORRECTION

Patent No. 2,860,093                      November 11, 1958

Eugene P. Wigner et al.

It is hereby certified that error appears in the printed specification of the above numbered patent requiring correction and that the said Letters Patent should read as corrected below.

Column 7, line 55, in the table, second column thereof, third line, for "$\frac{1}{4}$ kg" read -- $1\frac{1}{4}$ kg --.

Signed and sealed this 4th day of April 1961.

(SEAL)
Attest:     ERNEST W. SWIDER

Attesting Officer

ARTHUR W. CROCKER
Acting Commissioner of Patents